United States Patent [19]

Maruyama et al.

[11] Patent Number: 4,934,047
[45] Date of Patent: Jun. 19, 1990

[54] ASSEMBLY MACHINE

[75] Inventors: Tsutomu Maruyama; Hiroshi Ejiri; Akio Ozeki, all of Saitama, Japan

[73] Assignee: Honda Giken Kogyo Kabushiki Kaisha, Tokyo, Japan

[21] Appl. No.: 329,475

[22] Filed: Mar. 28, 1989

[30] Foreign Application Priority Data

Apr. 5, 1988 [JP] Japan .................................. 63-82184

[51] Int. Cl.⁵ ............................................. B23P 21/00
[52] U.S. Cl. ........................................ 29/783; 29/786; 29/787; 29/793; 29/795
[58] Field of Search .................. 29/771, 773, 783, 786, 29/787, 791, 793, 795

[56] References Cited

U.S. PATENT DOCUMENTS

| | | | |
|---|---|---|---|
| 3,845,537 | 11/1974 | Ayers et al. | 29/787 |
| 3,939,545 | 2/1976 | Stevens | 29/783 |
| 4,506,441 | 3/1985 | Yamanaga et al. | 29/787 |
| 4,670,961 | 6/1987 | Fontaine et al. | 29/791 X |
| 4,773,156 | 9/1988 | Kurita | 29/795 X |

FOREIGN PATENT DOCUMENTS 60-51980  8/1985  Japan .

Primary Examiner—Timothy V. Eley
Assistant Examiner—Frances Chin
Attorney, Agent, or Firm—Lyon & Lyon

[57] ABSTRACT

An assembly machine including a drive unit and an assembling unit removably coupled to the drive unit so as to be driven by the drive unit to assemble an assembly such as a torque converter case with an assembly part such as a valve body unit. The machine further includes an assembly part conveyance means for supply the assembly part, an assembling unit housing means for housing a plurality of assembling units, and a changeover conveyance means. The assembly part is conveyed from the assembly part conveyance means to the assembling unit by the changeover conveyance means. At the time of the change of the type of the assembly, the assembling unit is removed from the drive unit and conveyed onto the changeover conveyance means and the direction of conveyance of the changeover conveyance means is then changed over to convey the assembling unit into the assembling unit housing means, another assembling unit housed in the housing means is conveyed out of the means onto the changeover conveyance means, and the direction of conveyance of the changeover conveyance means is then changed over again to convey the other assembling unit to the drive unit.

8 Claims, 11 Drawing Sheets

ASSEMBLY MACHINE

BACKGROUND OF THE INVENTION

The field of the present invention relates to machines for assembling subassemblies and components together such as a torque converter case with a valve body unit, and particularly relates to such machines capable of efficiently coping with changes in components or subassemblies.

There has recently been more demand for the production of goods in prescribed batches with a number of variations in the goods between batches in order to meet the various desires of consumers. The assembly machines tend to be changed often in the course of producing multiple batches of goods with variations therebetween. In order to meet such requirements, a workpiece attach/detach device was developed as disclosed in the Japanese Patent Publication No. 60-51980(1985). In the device, an assembling unit called a head is supported on a horizontal circular rail so that the unit can be moved along the rail. About a quarter of the circular rail is cut off from the other and movable up and down relative to remainder of the rail. A workpiece, which is an assembly part, is held by the assembling unit on the unmovable portion of the circular rail. The unit is therafter moved along the rail so that the unit is placed on the vertically movable portion of the rail. The movable portion of the rail is then moved down to a processing station at which prescribed assembly work is carried out. However, if a number of units are required to cope with a large number of variations, the whole device would be large and heavy. For that reason, the assembling units, except the one supported on the rail, are housed separately from the device. As a result, exchanging the assembling units efficiently becomes difficult.

SUMMARY OF THE INVENTION

The present invention was made in order to solve the above-mentioned problem.

Accordingly, it is an object of the present invention to provide an improved assembly machine installed on an assembly conveyance passage and including a drive unit and an assembling unit which is removably coupled to the drive unit to be driven thereby. The assembly machine is characterized by comprising an assembly part conveyance means for supplying an assembly part; an assembling unit housing means which houses a plurality of assembling units and has an assembling unit conveyance mechanism for conveying the assembling units into and out of the housing means; and changeover conveyance means which is provided on the conveyance passage of the assembly part conveyance means so as to make it possible to optionally change the direction of conveyance for operative connection with the assembling unit conveyance mechanism and a drive mechanism for driving the assembly part conveyance means or the assembling unit conveyance mechanism which is connected to the changeover conveyance means.

The assembling unit removably coupled to the drive unit is driven thereby to assemble the assembly part held by the assembling unit with the assembly in the assembly conveyance passage.

The changeover conveyance means is connected to the assembly part conveyance means, and both the conveyance means are then driven by the drive mechanism provided in the changeover conveyance means, so that the assembly part to be held by the assembling unit is conveyed to a position under the assembling unit by the assembly part conveyance means and the changeover conveyance means.

When the assembly configuration is to change, the changeover conveyance means is connected to the assembly part conveyance means and the assembling unit conveyance mechanism in turn. The assembly part conveyance means and the assembling unit conveyance mechanism are driven in turn by the drive mechanism, so that the assembling unit uncoupled from the drive unit is conveyed into the assembling unit housing means and another assembling unit housed in the housing means is conveyed out therefrom to the drive unit. Different assembly configurations can thus be assembled at the same station.

DETAILED DESCRIPTION OF EXEMPLARY EMBODIMENT

An embodiment of the present invention is hereafter described in detail with reference to the drawings attached hereto.

Figure 1:
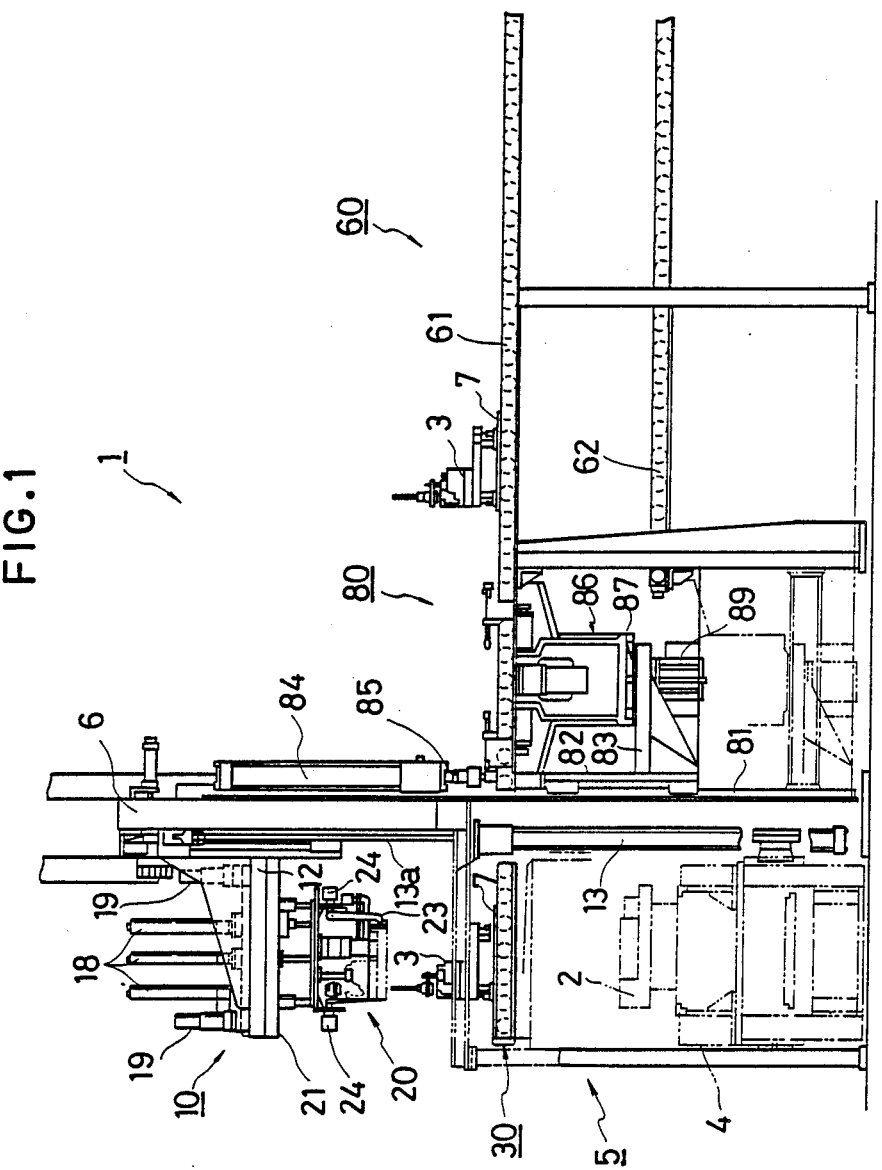
FIG. 1 shows a side view of an assembly machine which is an embodiment of the present invention.
Figure 2:
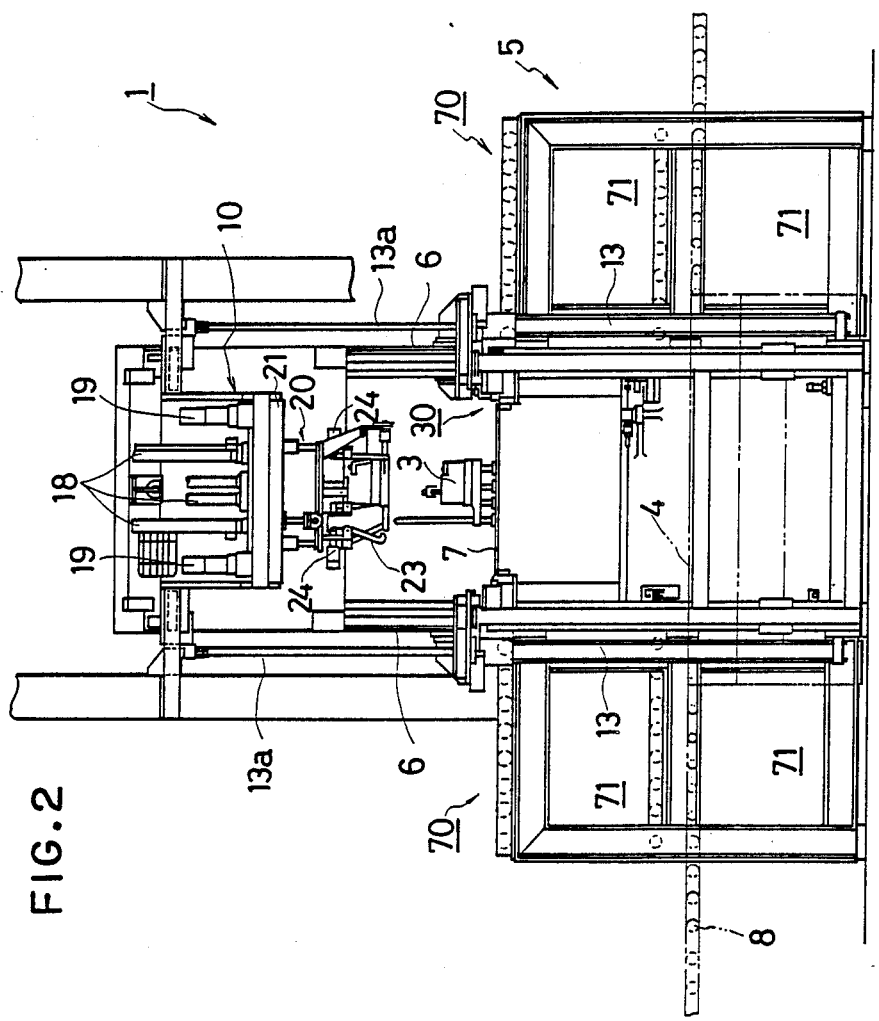
FIG. 2 shows a front view of the assembly machine.
Figure 3:
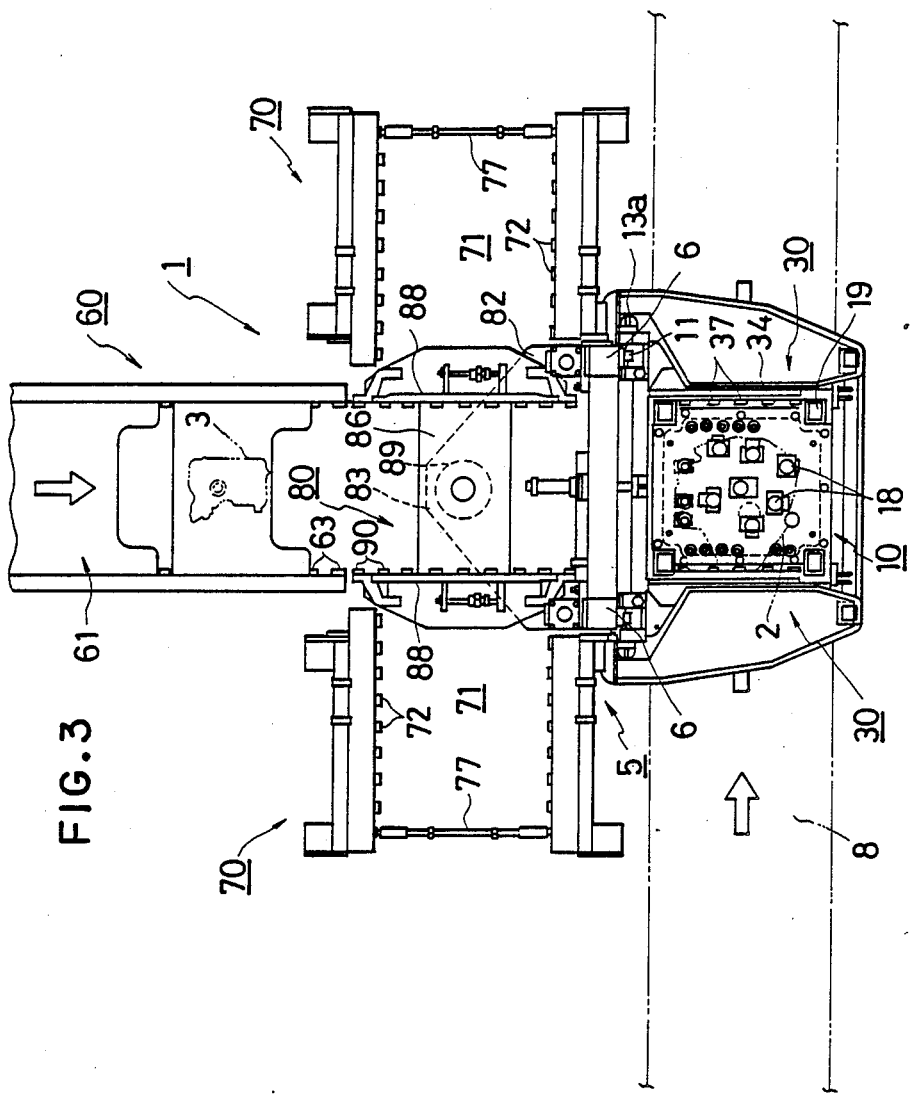
FIG. 3 shows a plan view of the assembly machine.

FIGS. 1 through 12 show an assembly machine 1 which is the embodiment. The machine 1 is for assembling the case 2 of a motor vehicle torque converter (assembly) with a valve body unit 3 (assembly part), as shown in FIGS. 1, 2 and 3. The torque converter case 2 is conveyed to a case rest 4 by a conveyor 8 constituting an assembly conveyance passage, and is then removably fixed in a prescribed posture at a prescribed location on the case rest. The frame 5 of the machine 1 is provided around the case rest 4. A pair of right and left pillars 6 are vertically arranged at the rear side edge of the conveyor 8. An assembling unit and assembly part transfer means 30 is provided over the case rest 4 and supported by the pillars 6 so that a supplied valve body unit 3 is first put on the transfer means.

A drive unit 10 is provided over the transfer means 30 so that the drive unit can be moved up and down guided by the pillars 6. An assembling unit 20, which is driven by the drive unit 10 and is removably coupled thereto. The valve body unit 3 put on the transfer means 30 is held by the assembling unit 20 which moves down together with the drive unit 10. The transfer means 30 is then opened rightward and leftward so that the drive unit 10 and the assembling unit 20 pass through the transfer means and reach the torque converter case 2 on the case rest 4. The assembling unit 20 is then driven by the drive unit 10 to attach the valve body unit 3 to the torque converter case.

A changeover conveyance means 80 is provided behind the assembling unit and assembly part transfer means 30. It is located opposite the conveyor 8 across the pillars 6 and extends perpendicularly to the conveyor. An assembly part conveyance means 60 is connected to the changeover conveyance means 80 and extends backwardly therefrom. The valve body unit 3 is supplied to the transfer means 30 by the assembly part conveyance means 60 and the changeover conveyance means 80.

An assembling unit housing means 70 is provided at the right and left sides of the changeover conveyance means 80 so as to house a large number of kinds of assembling units 20 corresponding to various kinds of valve body units 3, which are assembled with the cases 2 of a large number of types of torque converters which are to be manufactured in mutually separate sequential batches, each of which consists of a prescribed number of torque converters. When the type of the torque converter to be manufactured by assembling the torque converter case 2 with the valve body unit 3 is to be changed, the assembling unit 20 is separated from the drive unit 10 and is conveyed into the assembling unit housing means 70 by the assembling unit and assembly part transfer means 30 and the changeover conveyance means 80. Another assembling unit 20 housed in the housing means is conveyed out of housing means 70 to the transfer means 30 by the changeover conveyance means 80 so as to replace the preceding assembling unit, as is described in detail hereinafter.

The constitution of every portion of the assembly machine 1 is now described in detail. Guide rails 11 are attached to the fronts of the pillars 6 and extend vertically. A drive unit base 12 is vertically movably supported on the rails 11 and coupled to the upper ends of piston rods 13a of balance cylinders 13 provided along the pillars 6 and bearing the total weight of the drive unit 10.

Figure 4:
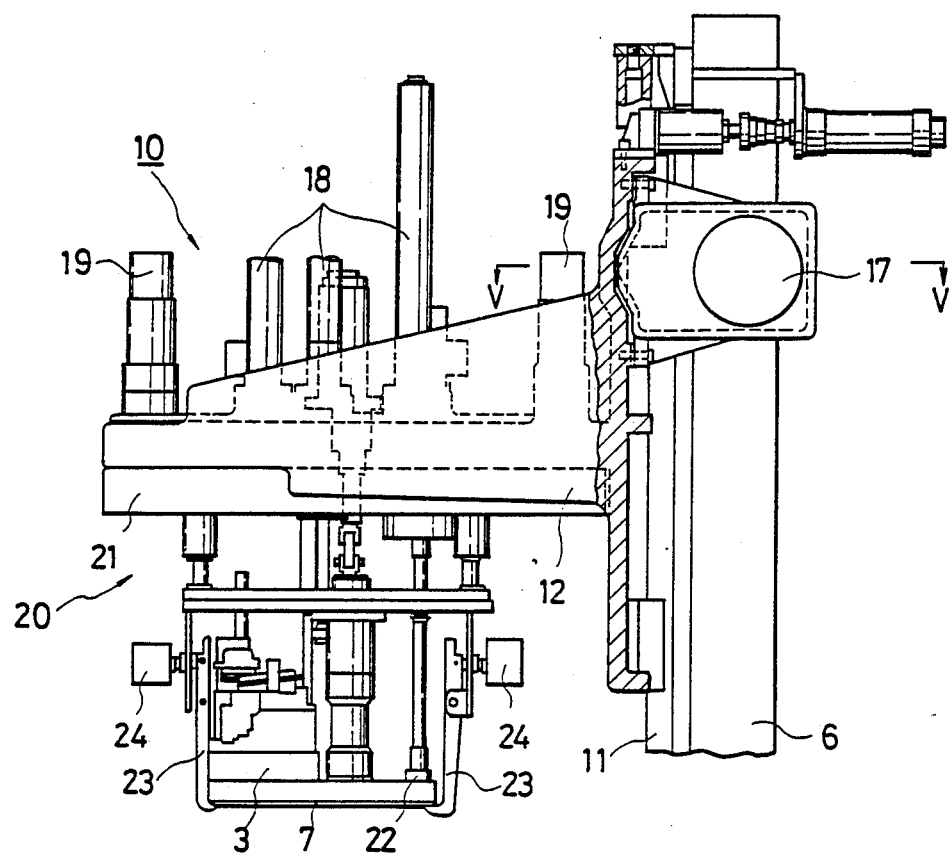
FIG. 4 shows a partially sectional side view of the drive unit of the assembly machine.
Figure 5:
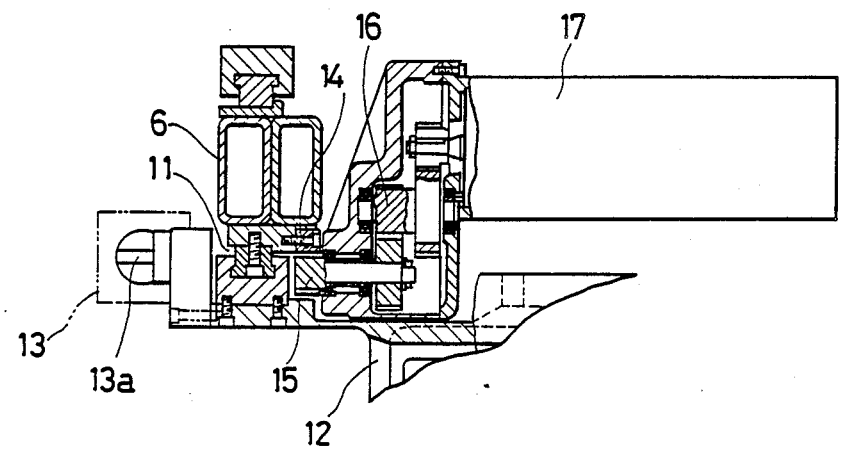
FIG. 5 shows a sectional view of the drive unit along a line V—V shown in FIG. 4.

A rack 14 is provided along one of the guide rails 11, and a pinion 15 is engaged with the rack and pivotally coupled to the drive unit base 12, as shown in FIGS. 4 and 5. The pinion 15 is movably connected to a vertical drive motor 17 through a transmission mechanism 16 so that the drive unit 10 is moved up and down by the forward and backward rotation of the motor.

A plurality of nut runners 18 are set up on the top of the drive unit 10. Clamps 19 made of reciprocating pneumatic cylinders are provided on the top of the drive unit at the four corners thereof. When each of the clamps 19 is moved back or forth, the engaging lower end portion of the clamp is rotated forward or back while being guided by a spiral mechanism provided in the clamp, so that the engaging portion is removably engaged with the base plate 21 of the assembling unit 20. A gear train and a control shaft holder, which are not shown in the drawings, are provided inside the base plate 21. A nut holder 22 extends down from the base plate 21 and is located in such a position that a nut can be tightened in accordance with the type of the valve body unit 3. A plurality of grabbing members 23, which are removably engaged with the valve body unit 3 to hold it, are pivotally coupled to the assembly unit 20. Pneumatic engage/disengage cylinders 24 are provided to swing the grabbing members 23 to open or close them.

Figure 6:
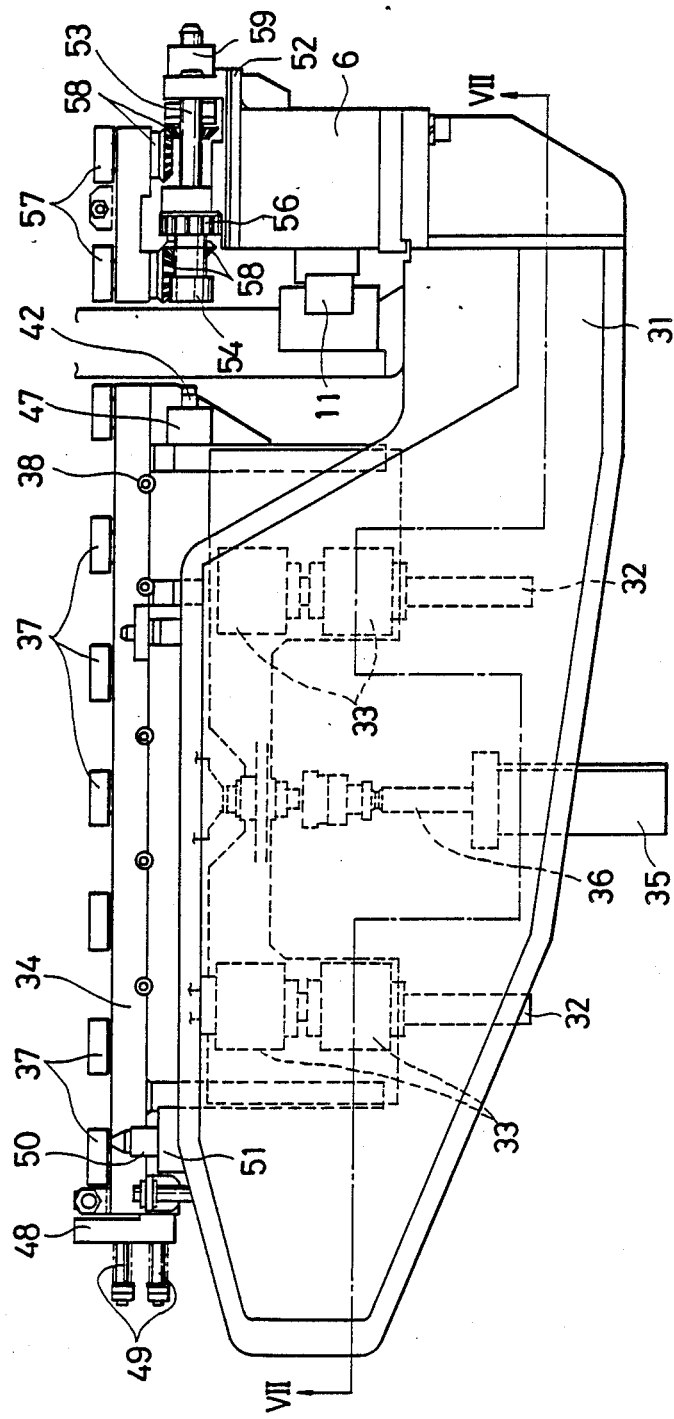
FIG. 6 shows a partial plan view of the assembling unit and assembly part transfer means of the assembly machine.
Figure 7:
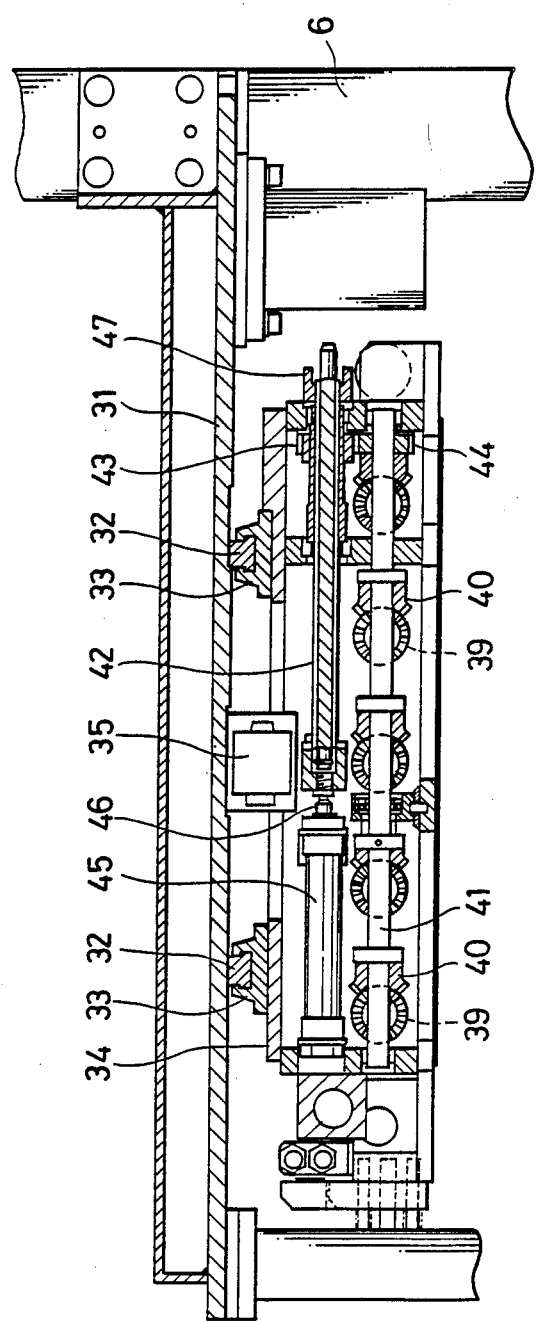
FIG. 7 shows a sectional view of the transfer means along a line VII—VII shown in FIG. 6.

The assembling unit and assembly part transfer means 30 for conveying the assembling unit 20 or the valve body unit 3 to a position over the conveyor 8 and supporting them includes a pair of right and left brackets 31 secured at the butts thereof to the right and the left pillars 6 over the conveyor 8. Guide rails 32 are attached to the bottoms of the brackets and extend rightward and leftward in parallel with the longitudinal direction of the conveyor 8. A pair of right and left conveyance bodies 34 are supported with sliders 33 on the guide rails 32 so that the bodies can be reciprocated rightward and leftward, as shown in FIGS. 3, 6 and 7. The tips of the piston rods 36 of pneumatic open/close cylinders 35 attached to the brackets 31 are coupled to the conveyance bodies 34 so that the conveyance bodies are moved toward or away from each other by protruding or retracting the piston rods. A plurality of conveyance rollers 37 having horizontal rotary shafts and a plurality of guide rollers 38 having vertical rotary shafts are provided on the inner portion of each conveyance body 34 and disposed at prescribed intervals in the longitudinal direction of the body. Bevel gears 39 are mounted on the rotary shafts of the conveyance rollers 37 and engage bevel gears 40 mounted on a drive shaft 41 extending along the row of the conveyance rollers. A reciprocating shaft 42 is pivotally coupled to the conveyance body 34 over the drive shaft 41 in parallel therewith and coupled with a gear 43 by a spline. The gear 43 is engaged with a gear 44 mounted on the drive shaft 41 so that the conveyance rollers 37 are rotated at the same time through the action of the gears, the drive shaft and the bevel gears 40 and 39 when the reciprocating shaft 42 is rotated. The piston rod 46 of a pneumatic attach/detach cylinder 45 is coupled to the front end of the reciprocating shaft 42 fixedly fitted with a clutch member 47 at the rear end of the shaft. The clutch member 47 can be engaged with and disengaged from another clutch member 54 mounted on an intermediate connection shaft 53 shown in FIG. 11 and described hereinafter. Each conveyance body 34 is fitted with a stop 48 for stopping the movement of a pallet 7 bearing the valve body unit 3, dampers 49 for absorbing the impact of the stop, a positioning pin 50, which is removably engaged with the pallet, and a pneumatic positioning cylinder 51 for moving the positioning pin back or forth.

Figure 11:
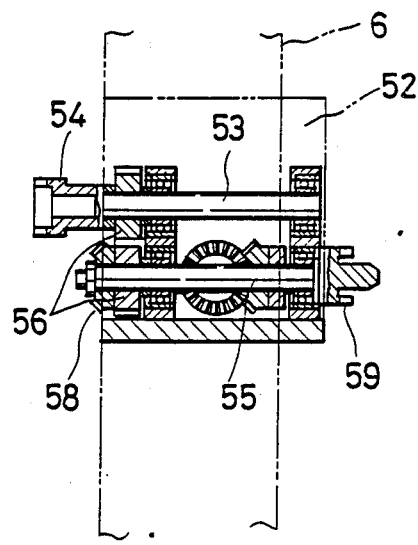
FIG. 11 shows a sectional view of the intermediate support base of the assembly machine.
Figure 12:
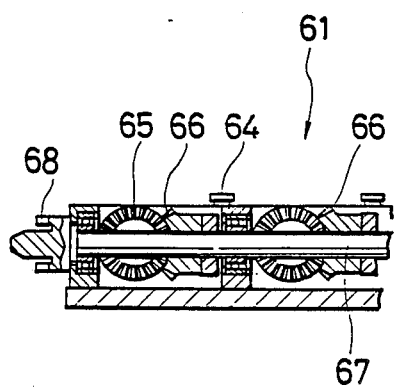
FIG. 12 shows a partial sectional view of the assembly part conveyance means of the assembly machine.

An intermediate support base 52 is provided inside the pillar 6 and extends along the axis of the reciprocating shaft 42, as shown in FIGS. 6 and 11. The intermediate connection shaft 53 is rotatably and pivotally coupled to the support base 52. An intermediate shaft 55 is rotatably and pivotally supported under the intermediate connection shaft 53. The shafts 53, 55 are connected with each other by gears 56. Conveyance rollers 57 are pivotally supported rotatably around horizontal axes extending rightward and leftward, and connected to the intermediate shaft 55 through bevel gears 58, as shown in FIG. 6. A clutch member 59 is mounted on the intermediate shaft 55 at the rear end thereof.

The assembly part conveyance means 60 includes a assembly part carry-in conveyor 61 extending on an upper level, and a pallet return conveyor 62 extending on a lower level. Many conveyance rollers 63, shown in FIG. 3 and similar to those 37 of the assembling unit and assembly part transfer means 30, and many guide rollers 64, shown in FIG. 12 and similar to those 38 of the transfer means, are pivotally coupled to both the side edges of the assembly part carry-in conveyor 61 and disposed at intervals in the longitudinal direction of the conveyor. A system for driving the conveyance rollers 63 is nearly similar to that of the transfer means 30. Bevel gears 65 are attached to the conveyance rollers 63 and engaged with other bevel gears 66 attached to drive shafts 67 extending in the rows of the conveyance rollers. Clutch members 68 are formed on the drive shafts 67 at the front ends thereof so that the clutch members can be removably engaged with those 99 of the changeover conveyance means 80. The pallet return conveyor 62 is similar to the assembly part carry-in conveyor 61.

Figure 8:
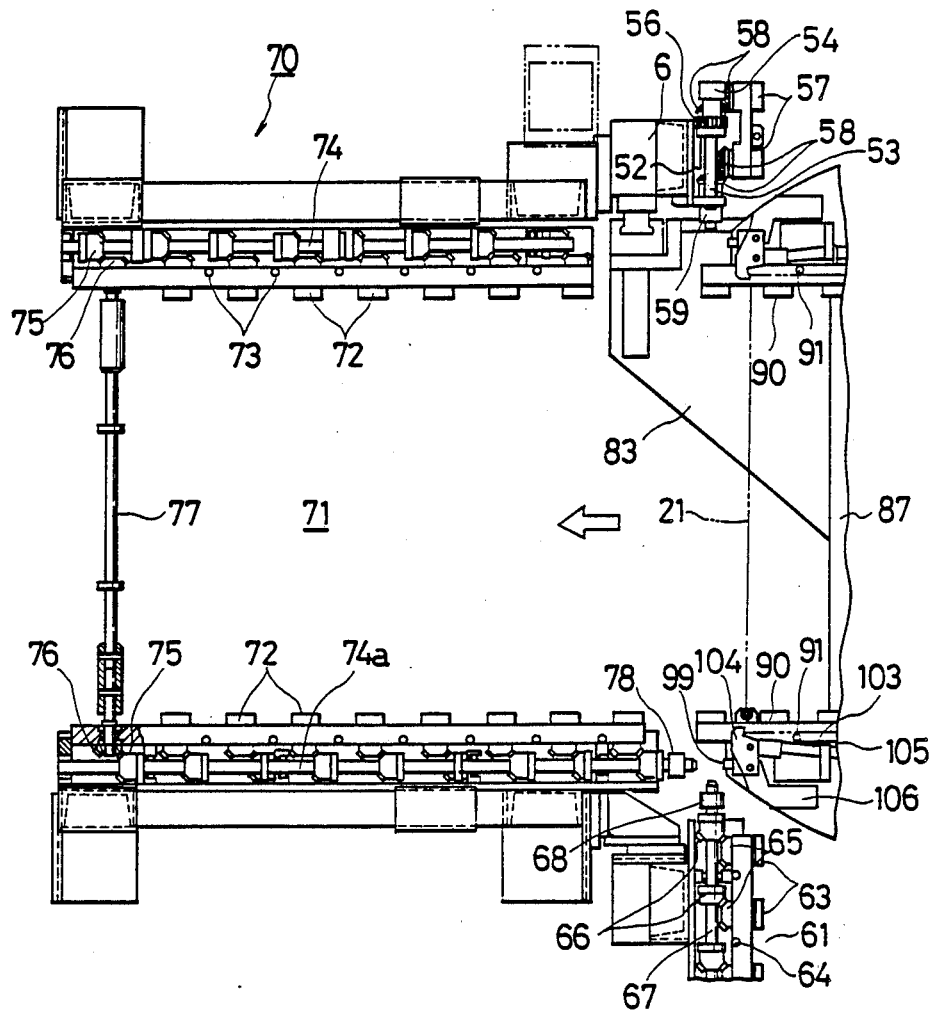
FIG. 8 shows a partial plan view of the assembling unit housing means of the assembly machine.

As shown in FIGS. 2 and 8, the assembling unit housing means 70 has four housing sections 71 in an upper right position, an upper left position, a lower right position and a lower left position, respectively. A large number of conveyance rollers 72 and a large number of guide rollers 73, which are similar to those of the assembling unit and assembly part transfer means 30, are pivotally coupled to each housing section 71 at both the side edges of the upper portion thereof and disposed at intervals in the direction of conveying-in and conveying-out of the assembling unit 20. A drive system for the conveyance rollers 72 is similar to that for the conveyance rollers 37 of the transfer means 30. The outer ends of drive shafts 74 and 74a coupled to the conveyance rollers 72 of each housing section 71 are connected to each other through bevel gears 75 and 76 and a connection shaft 77. The drive shaft 74a nearer the assembly part conveyance means 60 than the other drive shaft 74 is fixedly fitted with a clutch member 78, which is removably engaged with the clutch member 99 of the changeover conveyance means 80.

The changeover conveyance means 80, by which the conveyance of the valve body unit 3 between the assembling unit and assembly part transfer means 30 and the assembly part carry-in conveyor 61, the conveyance of the assembling unit 20 between the transfer means and the assembling unit housing means 70 and the conveyance of the pallet 7 between the transfer means and the pallet return conveyor 62 are performed, is now described in detail. As shown in FIG. 1, guide rails 81 are attached to the rear of the pillars 6 and extend vertically. A changeover unit base 82 is supported on the guide rails 81 so that the base is movable up and down. The base 82 is attached to the lower ends of the piston rods 85 of balance cylinders 84 provided along the pillars 6 and bearing the weight of the changeover conveyance means 80. The base 82 is moved up and down by the same kind of mechanism as the drive unit 20.

Figure 9:
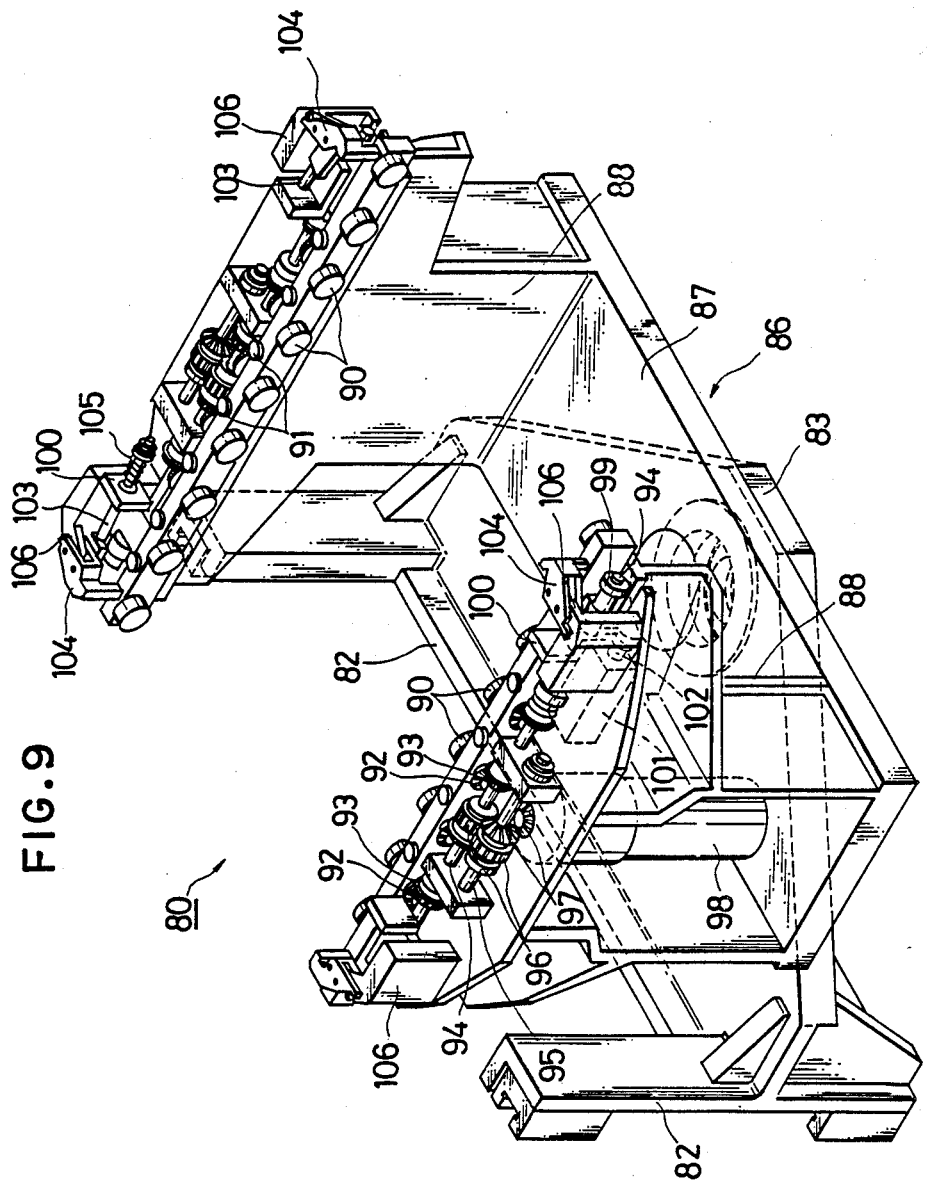
FIG. 9 shows a perspective view of the changeover conveyance means of the assembly machine.
Figure 10:
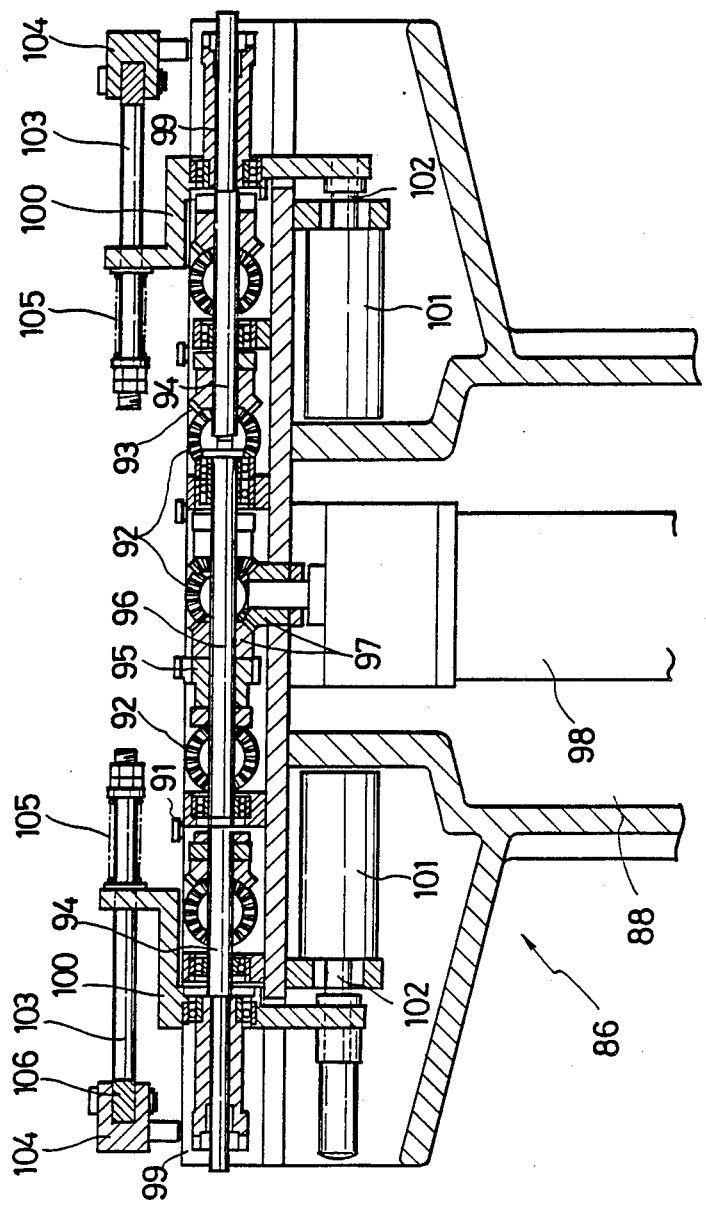
FIG. 10 shows a sectional view of the changeover conveyance means.

The bottom plate 87 of a rotary holder 86 is pivotally coupled to the horizontal support portion 83 of the changeover unit base 82 so that the rotary holder can be turned around a vertical axis by a rotatory motor 89 provided under the bottom plate. The rotary holder 86 has a pair of side walls 88, to the insides of which conveyance rollers whose axes extend horizontally and guide rollers 91 whose axes extend vertically are pivotally coupled so that the rollers are disposed at prescribed intervals in the longitudinal directions of the side walls. As shown in FIGS. 9 and 10, bevel gears 92 are fixedly attached to the conveyance rollers 90 and engage with other bevel gears 93 fixedly fitted on driven shafts 94 extending along the rows of the conveyance rollers. As shown in FIG. 9, drive shafts 95 are provided outside the driven shafts 94 in parallel therewith and pivotally coupled to the side walls 88. The drive shafts 95 are connected to the driven shafts 94 through gears 96 and connected to conveyance motors 98 through bevel gears 97 so that the conveyance rollers 90 are rotated forward or backward by the forward or backward rotation of the conveyance motors.

The clutch members 99 are coupled to the driven shafts 94 at both the ends thereof by splines. A coupling member 100 is provided at each clutch member 99 and supports it rotatably. The tip of the piston rod 102 of a pneumatic attach/detach cylinder 101 is coupled to the coupling member 100. A coupling rod 103 is slidably fitted in the coupling member 100. The tip of the coupling rod 103 is pivotally coupled to an engaging lever 104. A compressed coil spring 105 is provided between the butt of the coupling rod 103 and the coupling member 100. The engaging lever 104 is pivotally coupled to a bracket 106 secured to the side wall 88, so that the lever is swingable about a vertical axis. When the piston rod 102 of the attach/detach cylinder 101 is retracted as shown in FIGS. 9 and 10, the clutch member 99 is moved back and the engaging lever 104 is protruded toward the center of the width of the rotary holder 86 as shown in FIG. 8, so that the base plate 21 of the assembling unit 20 on the conveyance rollers 90 is held by engagement with the lever. When the piston rod 102 is protruded, the clutch member 99 is moved forth and the engaging lever 104 is turned outwardly so that the base plate 21 is released out of engagement with the lever.

The operation of the assembly machine 1, which is to assemble the torque converter case 2 with the valve body unit 3, is now described in detail. Let us suppose that the assembling unit 20 suitable for the valve body unit 3 to be assembled with the torque converter case 2, is already coupled to the drive unit 10. The rotary holder 86 of the changeover conveyance means 80 is first oriented toward the assembling unit and assembly part transfer means 30 and the assembly part conveyance means 60 so that the tops of the side walls 88 of the rotary holder coincide with the assembly part carry-in conveyor 61. The piston rods of the pneumatic attach/detach cylinders 101 of the changeover conveyance means 80, which are located near the assembly part conveyance means 60, are then put into action so that the corresponding clutch members 99 are engaged with the clutch members 68 of the conveyor 61. The conveyance motors 98 are thereafter put into action. The motive power of the motors 98 is transmitted to the conveyor 61 through the clutch members 99 and 68 so that the conveyance rollers 63 are rotated. At that time, the changeover conveyance means 80 performs rotation based on the motive power of the conveyance motors 98. As a result, the valve body unit 3 and the pallet 7 put on the assembly part carry-in conveyor 61 and bearing the valve body unit are carried onto the changeover conveyance means 80.

The piston rods of the other pneumatic attach/detach cylinders 101 of the changeover conveyance means 80 are then protruded so that the corresponding clutch members 99 are engaged with the clutch members 59 of the intermediate support base 52. The piston rods of the pneumatic attach/detach cylinders 45 of the assembling unit and assembly part transfer means 30 are protruded so that the clutch members 47 of the transfer means are engaged with those 54 of the intermediate base 52. After that, the conveyance motors 98 are put into action so that the conveyance rollers 90 of the changeover conveyance means 80, the conveyance rollers 57 of the intermediate support base 52 and the conveyance rollers 37 of the transfer means 30 are rotated. As a result, the pallet 7 and the valve body unit 3 on the changeover conveyance means 80 are conveyed onto the transfer means 30 along the intermediate support base 52 so that the pallet and the valve body unit are halted by the stops 48.

Once the pallet and the valve body unit are thus positioned, the drive unit 10 is moved down, and the pneumatic engage/disengage cylinders 24 of the assembling unit 20 are put into action so that the grabbing members 23 are engaged with the valve body unit 3 on the pallet 7. The conveyance motors 98 of the changeover conveyance means 80 are then rotated backward so that the pallet 7 on the conveyance rollers 37 is returned onto the conveyance rollers 90 along the conveyance rollers 57. The piston rods of the pneumatic open/close cylinders 35 of the transfer means 30 are retracted so that the conveyance body 34 of the means are opened. Subsequently, the drive unit 10 is moved down so that the bottom of assembling unit 20 is positioned on the top of the torque converter case 2 on the case rest 4 of the conveyor 8. The nut runners 18 are then put into action so that the valve body unit 3 is assembled on the torque converter case 2.

During the assembly operation of the assembly machine 1, the changeover conveyance means 80 is moved down and the conveyance motors 98 thereof are then rotated backward so that the pallet 7 on the conveyance rollers 90 of the means is conveyed out onto the pallet return conveyor 62. After the pallet 7 is conveyed out, the changeover conveyance means 80 is moved up and the conveyance motors 98 are then rotated forward so that a next pallet 7 bearing a next valve body unit 3 is conveyed in from the valve body unit carry-in conveyor 61 onto the conveyance rollers 90 of the changeover conveyance means 80. At that time, the drive unit 10 having finished assembling the valve body unit 3 to the torque converter case 2 on the case rest 4 is moved up, and the piston rods of the pneumatic open/close cylinders 35 of the assembling unit and assembly part transfer means 30 are then protruded so that the conveyance body 34 is closed. As a result, preparations for the next assembly operation of the machine 1 are completed. A batch of torque converters are thus manufactured.

The way of making prescribed preparations to assemble a torque converter case of another type with a valve body unit by the assembly machine 1 to manufacture a torque converter of another type is now described. The drive unit 10 is first moved down as the machine 1 remains in a state such as shown in FIGS. 1, 2 and 3 but not having the valve body unit 3 on the transfer means 30, so that the base plate 21 of the assembling unit 20 is put on the conveyance rollers 37 of the transfer means 30. The clamps 19 are rotated backward so that the drive unit 10 and the assembling unit 20 are uncoupled from each other. The tops of the side walls 88 of the changeover conveyance means 80 are made coincident with the transfer means 30. The attach/detach cylinders 101 of the conveyance means 80 are put into action so that the clutch members 99 thereof are engaged with the clutch members 59 of the intermediate support base 52. The attach/detach cylinders 45 of the transfer means 30 are put into action so that the clutch members 47 thereof are engaged with the clutch members 54 of the support base 52. The conveyance motors 98 of the conveyance means 80 are then put into action to rotate the conveyance rollers 37 and 57 so that the base plate 21 of the assembling unit 20 on the conveyance rollers 37 of the transfer means 30 is put on the conveyance rollers 90 of the conveyance means 80. The rotary holder 86 is then turned by an angle of 90° by the rotatory motor 89 of the changeover conveyance means 80 so that the tops of the side walls 88 of the means coincide with the empty housing section 71 of the assembling unit housing means 70. The attach/detach cylinders 101 of the changeover conveyance means 80 are put into action so that the clutch members 99 thereof are engaged with the clutch members 78 of the empty housing section 71. The conveyance motors 98 of the conveyance means 80 are thereafter put into action to rotate the conveyance rollers 90 and 72 so that the assembling unit 20 on the conveyance rollers 90 is conveyed into the empty housing section 71. After that, the tops of the side walls 88 of the changeover conveyance means 80 are made coincident with the housing section 71 in which another assembling unit 20 necessary to assemble the other type of torque converter case with the other type of valve body unit is located. The assembling unit 20 is then put onto the conveyance rollers 90 of the conveyance means 80. The rotary holder 86 is turned further by an angle of 90° so that the assembling unit 20 is conveyed onto the conveyance rollers 37 of the transfer means 30 and coupled to the drive unit 10. The prescribed preparations for assembling the torque converter case of the other type with the valve body unit of the other type are thus made. It will be understood from the above description that four kinds of assembling units can be efficiently changed for each other in the assembly machine 1 to assemble four types of torque converters.

What is claimed is:

1. An assembly machine installed on an assembly conveyance passage and including a drive unit and assembling units for removable coupling to said drive unit so as to be driven by said drive unit, comprising
   an assembly part conveyance means for supplying an assembly part;
   an assembly unit housing means which houses a plurality of assembling units and has an assembling unit conveyance mechanism for conveying assembling units into and out of said housing means; and
   a changeover conveyance means movably mounted for selective alignment with said assembly part conveyance means and with said assembling unit conveyance mechanism and having a drive mechanism for driving said assembly part conveyance means or said assembling unit conveyance mechanism.

2. An assembly machine according to claim 1, wherein the changeover conveyance means includes a plurality of conveyance rollers, motive power transmission shafts operationally coupled to said rollers, roller drivers for driving said shafts to rotate said rollers, clutch members provided on said shafts at both the ends thereof, clutch member drivers for moving said members in the axial directions of said shafts, and a rotatable holder supporting said rollers, said shafts, said roller drivers and said clutch member drivers.

3. An assembly machine according to the claim 2, wherein the assembly part conveyance means includes a plurality of conveyance rollers, motive power transmission shafts operationally coupled to said rollers, and clutch members provided on said shafts at one end of each of said shafts so that said members can be engaged with other clutch members provided in the changeover conveyance means at one end thereof.

4. An assembly machine according to the claim 2, wherein the assembly unit conveyance mechanism includes a plurality of conveyance rollers, motive power transmission shafts operationally coupled to said rollers, and clutch members provided on said shafts at one end of each of said shafts so that said members can be engaged with other clutch members provided in the changeover conveyance means at one end thereof.

5. An assembly machine according to the claim 1, wherein an assembling unit and assembly part transfer means for conveying the assembling unit and the assembly part in and out is provided under the drive unit; and an assembly part conveyance passage is defined by said transfer means, the changeover conveyance means and the assembly part conveyance means.

6. An assembly machine according to the claim 5, wherein a conveyance mechanism of the assembling unit and assembly part transfer means is driven by the drive mechanism of the changeover conveyance means.

7. An assembly machine according to the claim 5, wherein an intermediate support base is provided between the assembling unit and assembly part transfer means and the changeover conveyance means.

8. An assembly machine according to the claim 6, wherein an intermediate support base is provided between the assembling unit and assembly part transfer means and the changeover conveyance means.

* * * * *